US009787089B2

United States Patent
Chong et al.

(10) Patent No.: US 9,787,089 B2
(45) Date of Patent: Oct. 10, 2017

(54) APPARATUS AND METHOD FOR A MOBILE ROUTER TO RECEIVE POWER FROM A PLURALITY OF POWER SUPPLIES

(71) Applicant: Pismo Labs Technology Limited, Hong Kong (HK)

(72) Inventors: Ming Pui Chong, Hong Kong (HK); Chi Kwong So, Hong Kong (HK)

(73) Assignee: PISMO LABS TECHNOLOGY LIMITED (HK)

( * ) Notice: Subject to any disclaimer, the term of this patent is extended or adjusted under 35 U.S.C. 154(b) by 402 days.

(21) Appl. No.: 14/410,100

(22) PCT Filed: Aug. 29, 2014

(86) PCT No.: PCT/IB2014/064147
§ 371 (c)(1),
(2) Date: Dec. 21, 2014

(87) PCT Pub. No.: WO2016/030725
PCT Pub. Date: Mar. 3, 2016

(65) Prior Publication Data
US 2016/0268801 A1 Sep. 15, 2016

(51) Int. Cl.
*G06F 1/26* (2006.01)
*H02J 1/00* (2006.01)
(Continued)

(52) U.S. Cl.
CPC ............... *H02J 1/00* (2013.01); *G06F 1/263* (2013.01); *G06F 1/3212* (2013.01); *H02J 1/108* (2013.01);
(Continued)

(58) Field of Classification Search
CPC . G06F 1/263; G06F 1/30; G06F 1/305; G06F 1/3212; H02J 1/00; H02J 1/108; H02M 3/04
(Continued)

(56) References Cited

U.S. PATENT DOCUMENTS 9,692,247 B2 * 6/2017 Rostami .................. H02J 7/022
2005/0174710 A1 * 8/2005 Masui ..................... G06F 1/266
361/92

(Continued)

FOREIGN PATENT DOCUMENTS

CN 101788969 A 7/2010
CN 101803187 A 8/2010
(Continued)

OTHER PUBLICATIONS

International Search Report in International Application No. PCT/IB2014/064147, dated Jun. 5, 2015.
(Continued)

*Primary Examiner* — William Hernandez

(57) ABSTRACT

The present invention discloses an apparatus and a method for using a plurality of external USB power sources. The electronic apparatus comprises a plurality of USB jacks, a plurality of first diodes, at least one external power source jack, a second diode and a first voltage converter, a processing unit, a main memory, a network interface, at least one SIM card slot, a RF transceiver and a secondary storage. Further when voltage supplied via one or more of the external USB power sources is below a first reference voltage, a first action is performed.

18 Claims, 11 Drawing Sheets

(51) Int. Cl.
    *H02M 3/04*         (2006.01)
    *H02J 1/10*         (2006.01)
    *G06F 1/32*         (2006.01)

(52) U.S. Cl.
    CPC ............... *H02M 3/04* (2013.01); *G06F 1/324* (2013.01); *G06F 1/3206* (2013.01); *G06F 1/3265* (2013.01); *Y02B 60/1217* (2013.01); *Y02B 60/1242* (2013.01); *Y02B 60/1292* (2013.01)

(58) Field of Classification Search
    USPC .............................................. 307/43, 80, 82
    See application file for complete search history.

(56) References Cited

U.S. PATENT DOCUMENTS

2014/0111030 A1*   4/2014   Chou ........................ G05F 1/10
                                                                                 307/130
2016/0352101 A1*   12/2016   Koo .......................... H02J 1/12

FOREIGN PATENT DOCUMENTS

CN           202474946 U      10/2012
KR           20140093058 A     7/2014

OTHER PUBLICATIONS

Written Opinion of the international Searching Authority in International Application No. PCT/IB2014/064147, dated Jun. 5, 2015.

\* cited by examiner

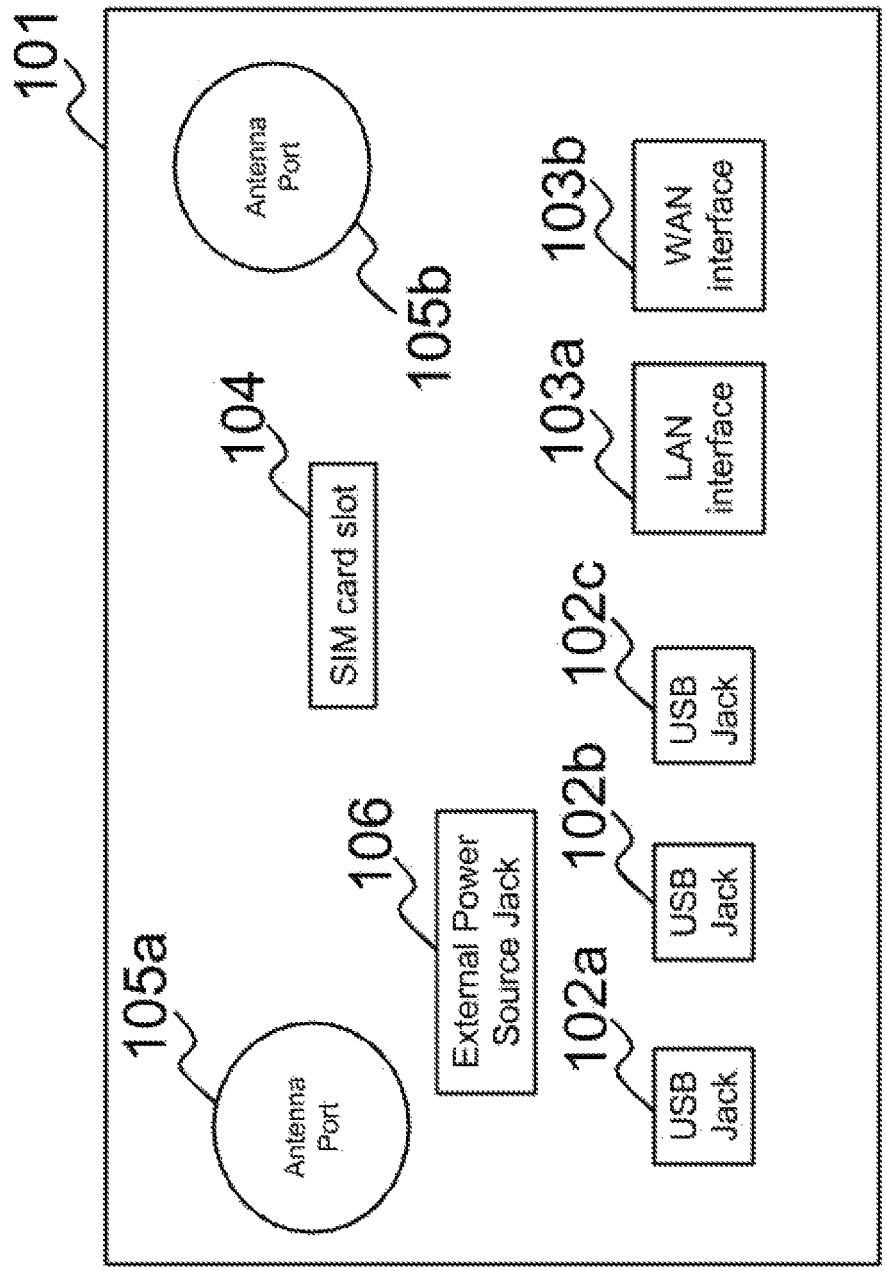
[Fig. 1]

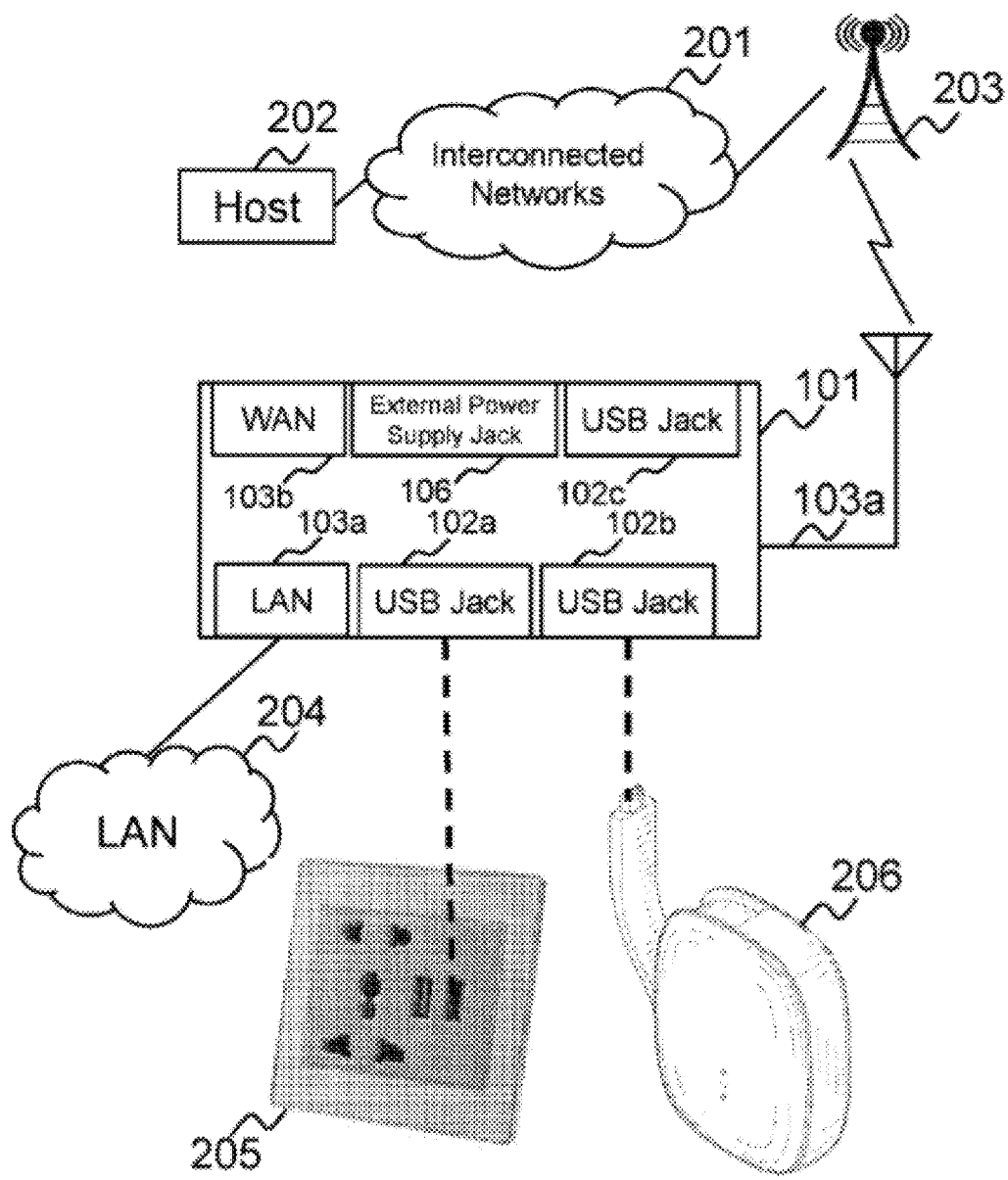
[Fig. 2]

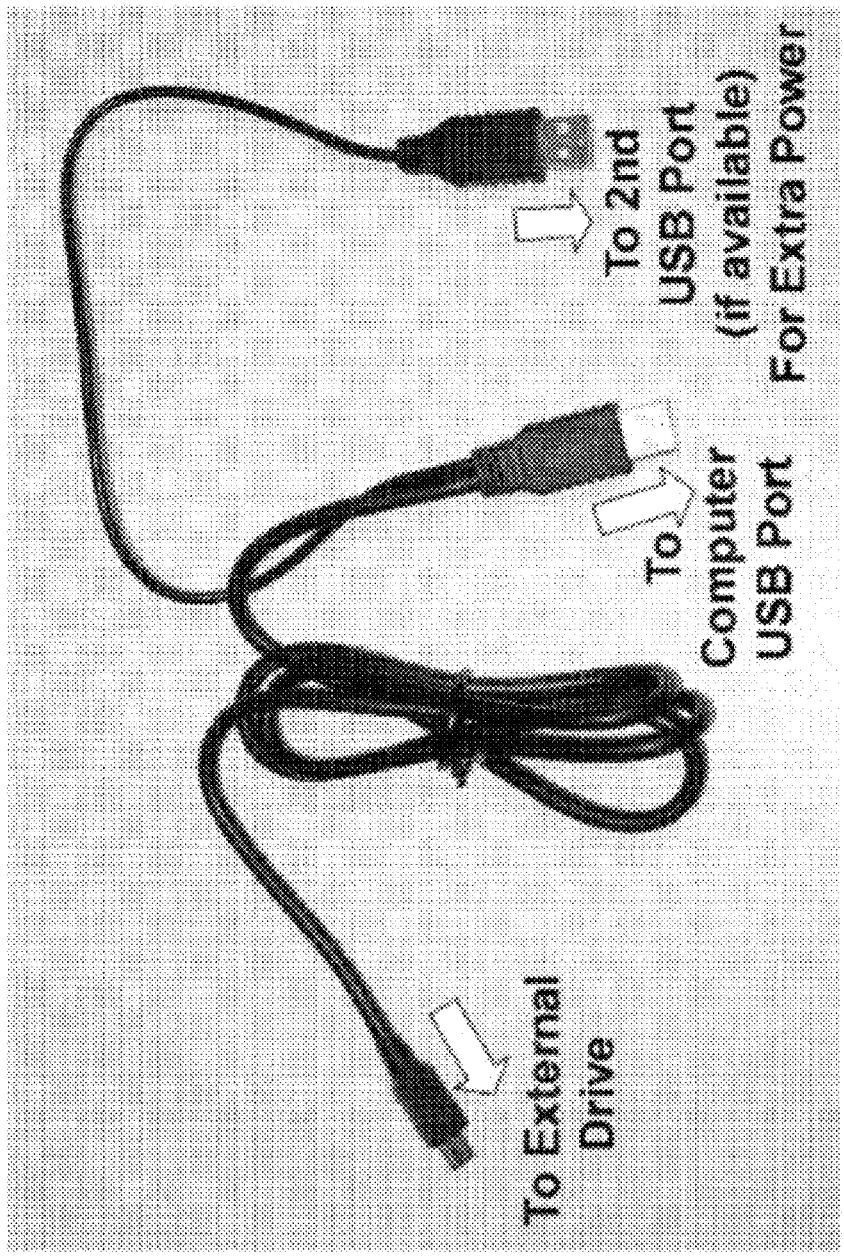
[Fig. 3]

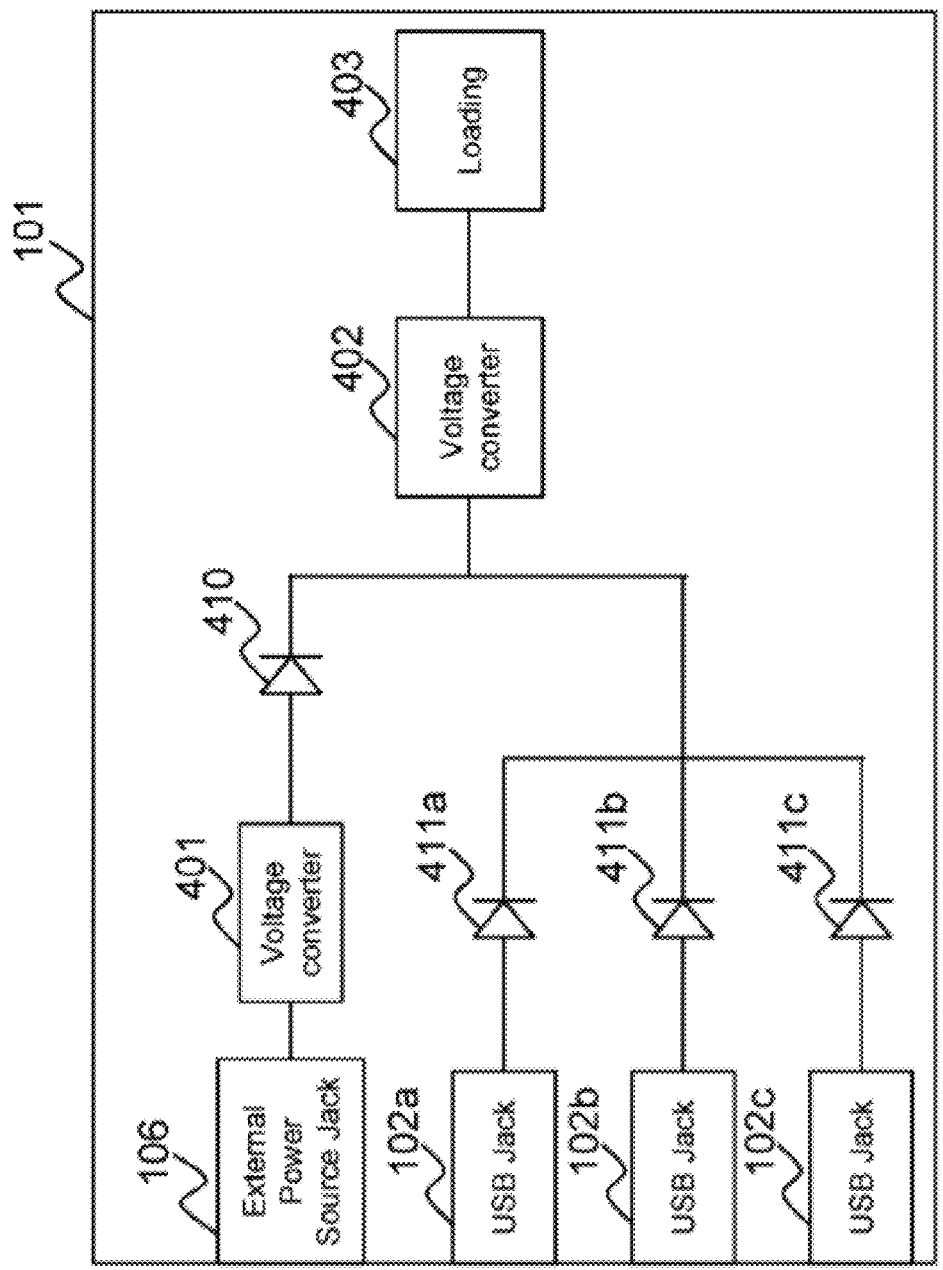

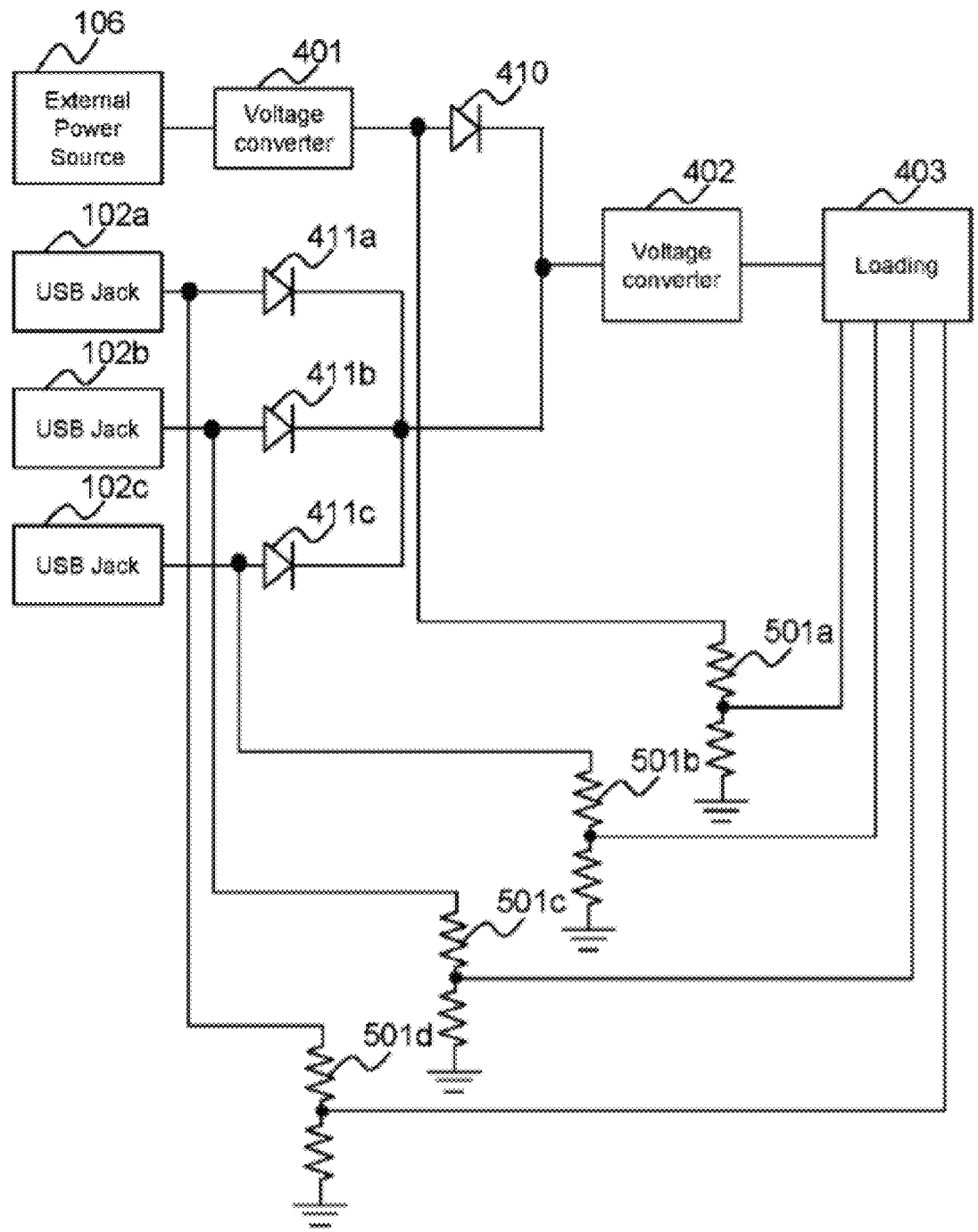
[Fig. 5]

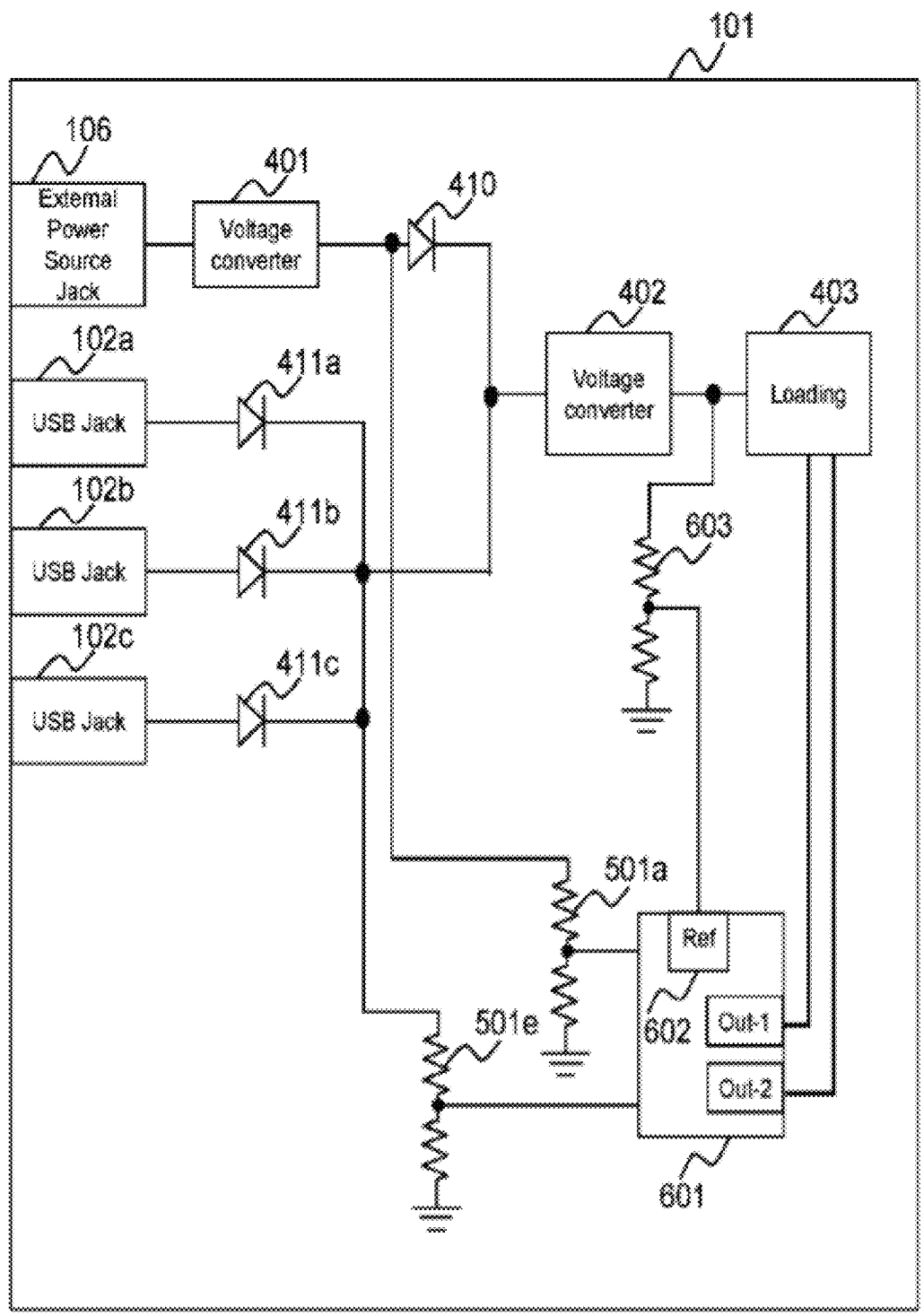
[Fig. 6]

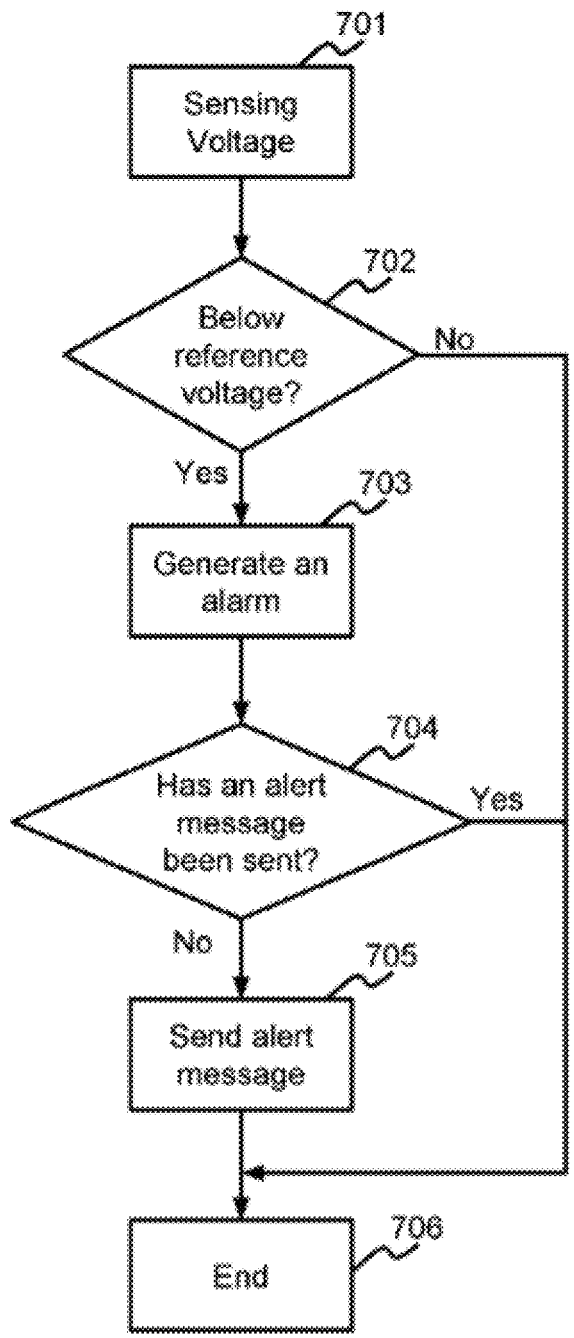
[Fig. 7]

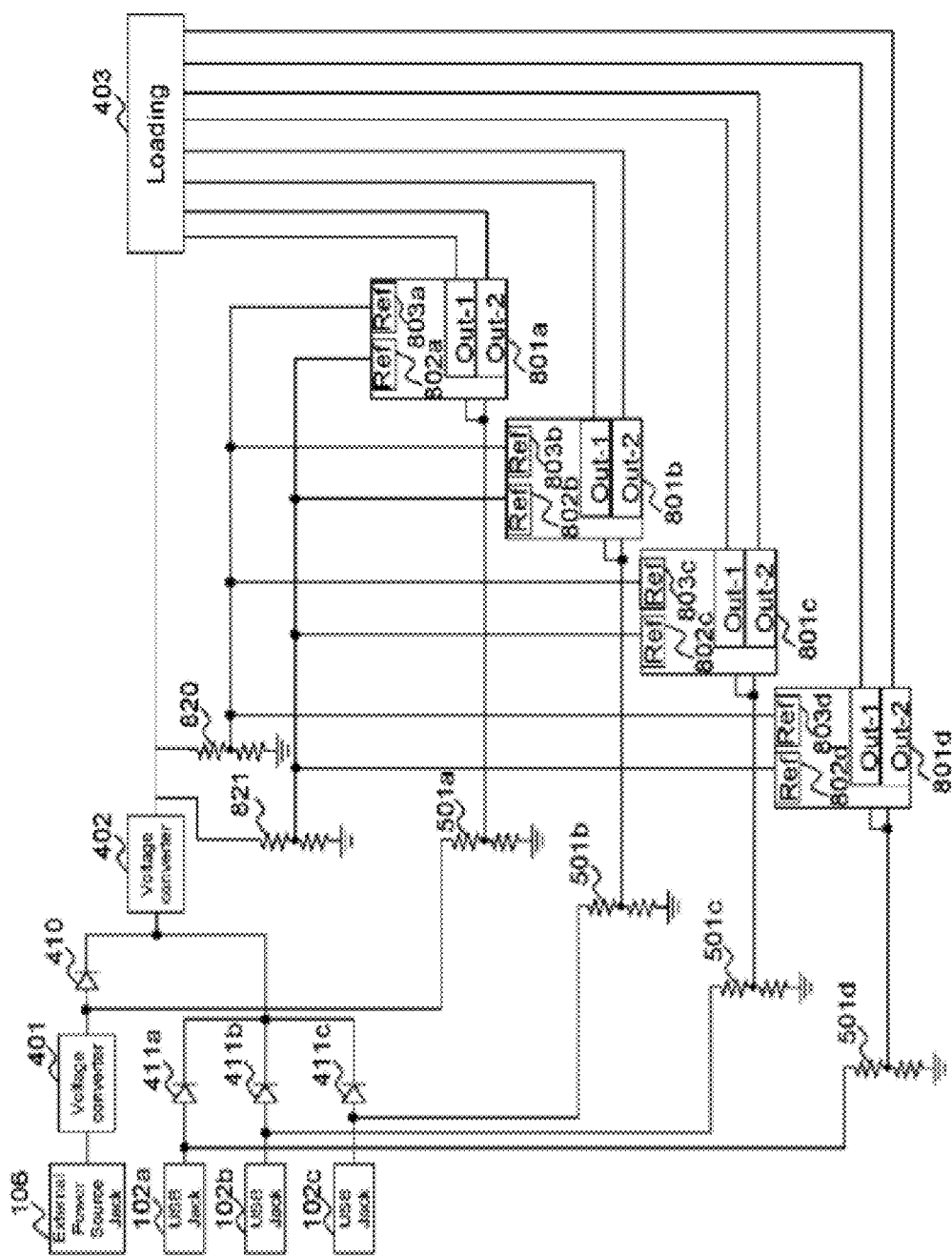
[Fig. 8]

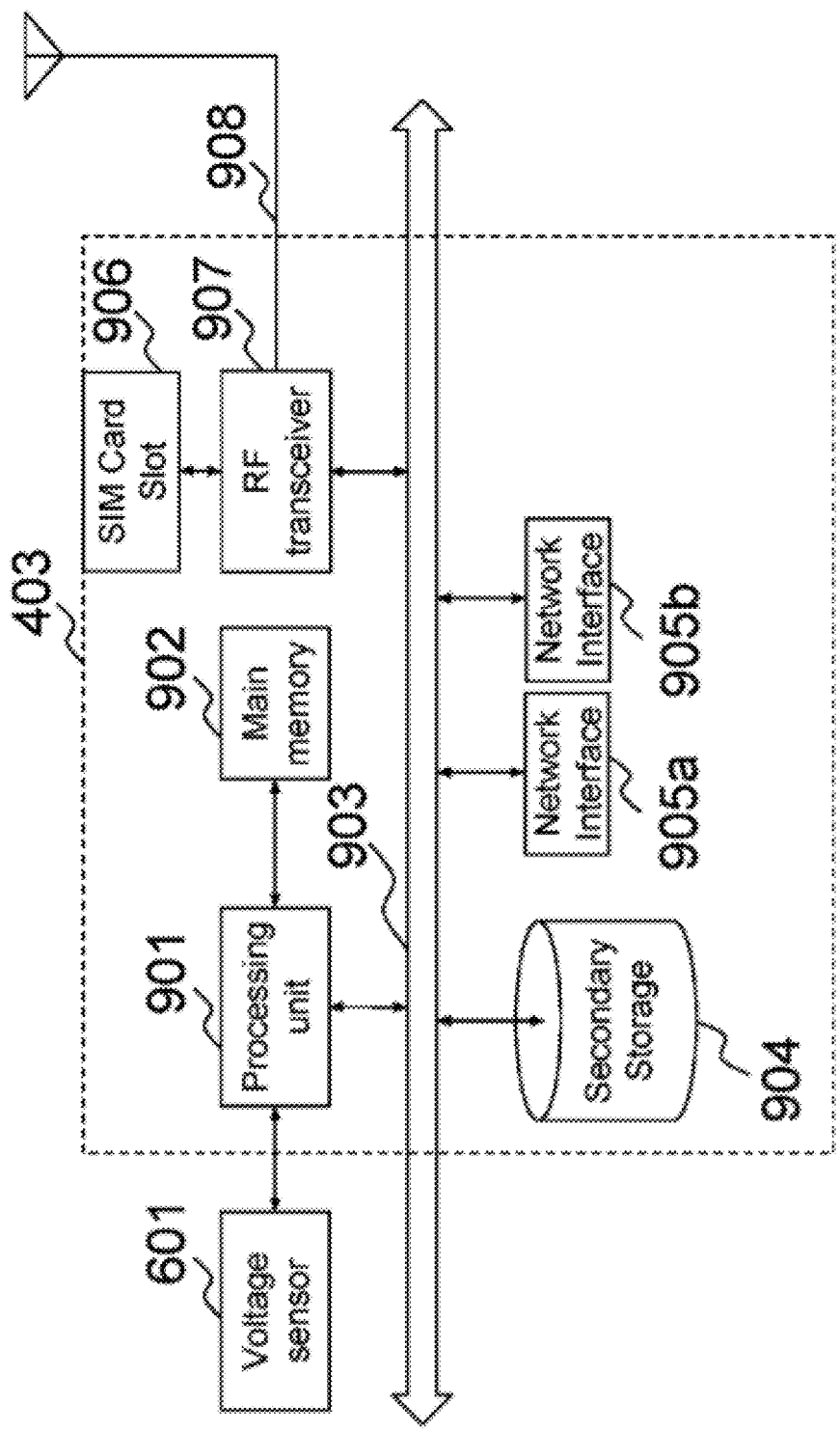
[Fig. 9]

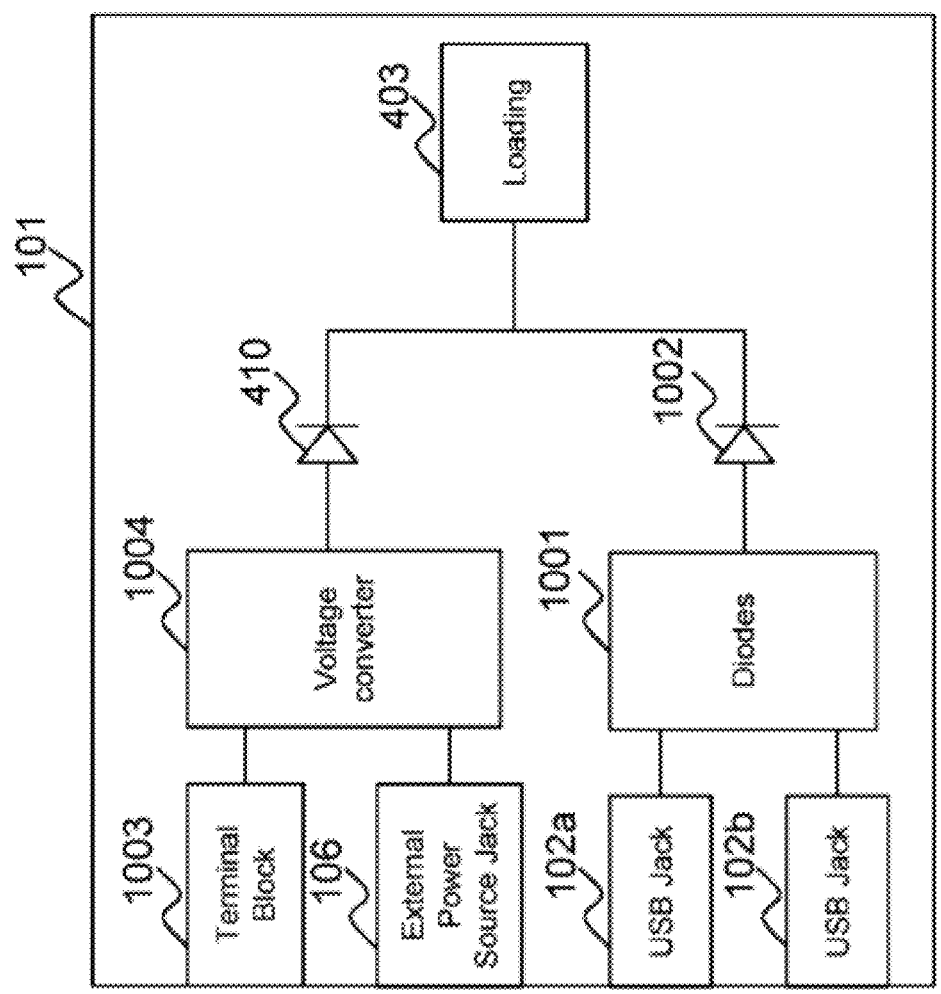
[Fig. 10]

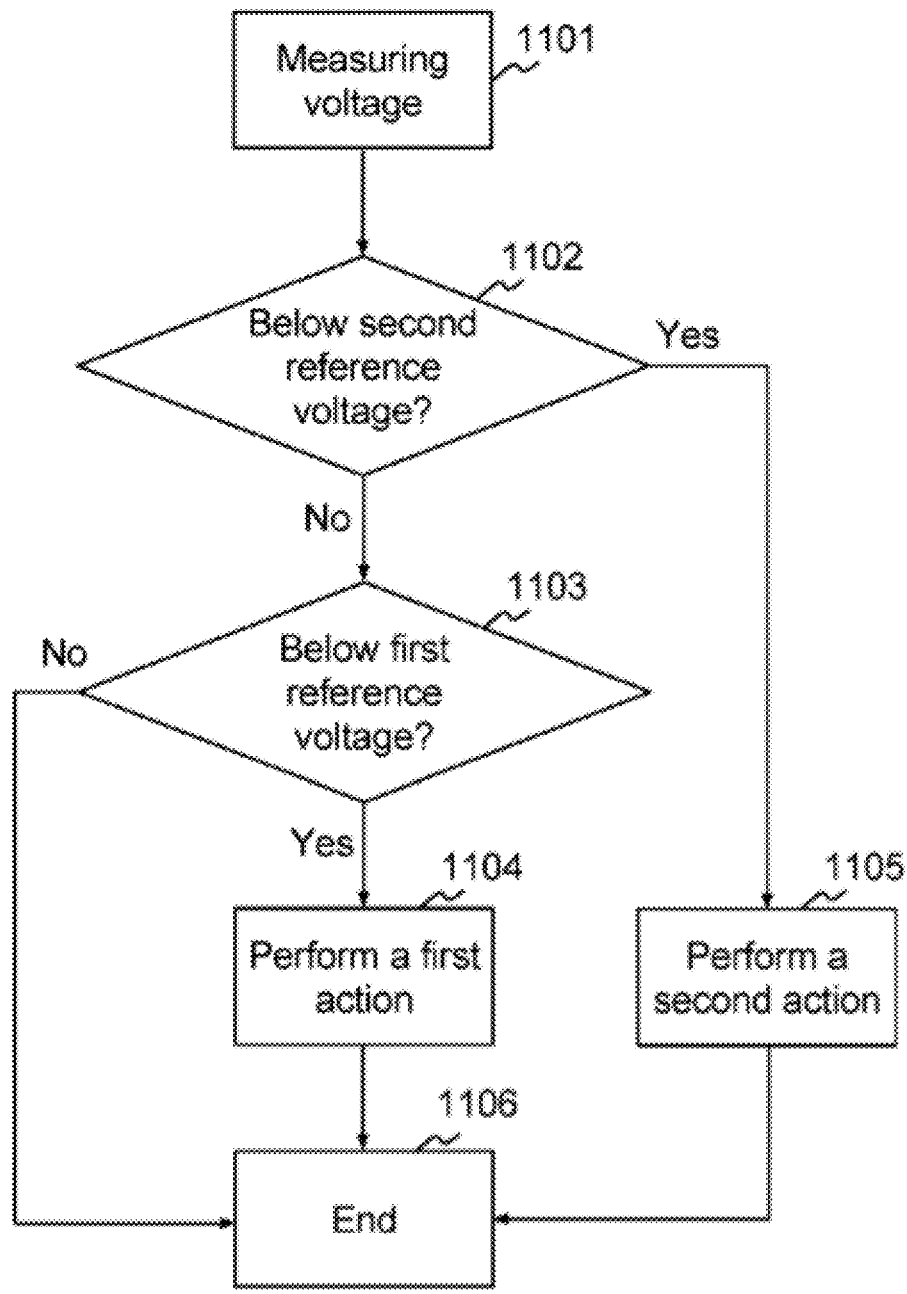
[Fig. 11]

APPARATUS AND METHOD FOR A MOBILE ROUTER TO RECEIVE POWER FROM A PLURALITY OF POWER SUPPLIES

TECHNICAL FIELD

The present invention relates in general to the field of mobile networking apparatus and power supply circuits, and in particular to circuitries utilized by such mobile networking apparatus to implement methods and processes. Still more particularly, the present invention relates to circuitries to allow the mobile networking apparatus to receive power supplied by a plurality of USB power supplies

BACKGROUND ART

Universal serial buses (USB), being one of the most popular transmission means today that can be disposed on various surfaces, can be adapted for almost all kinds of devices that are to be used for different operations, such as data transmission or charging, etc. The amount of power that can be provided by a USB connector may not be enough for an electronic device. Therefore, there are cables available to allow using two USB connectors to supply power. FIG. 3 is a prior art illustrating a USB cable has two inputs and one output (Dual-input USB Cable). The two inputs are for connecting to USB ports of a computer. The output is for connecting to an external hard drive. Once the USB cable is connected, the external drive may be able receive adequate power supply from the computer through the Dual-input USB Cable.

However, carrying a dual-input USB Cable is not convenient. Further, if power supply provided through one USB port is adequate, the other USB port may be used as a backup power supply for redundancy purpose. It is also desirable to have the power supplied from two independent sources, instead of from the same computer or USB power supply. This is particularly important for device that does not have internal battery. Further, as there are many non-standard compliant USB power supplies, protection needs to be built-in to avoid damage to electronic circuits.

DISCLOSURE OF INVENTION

Summary of Invention

USB power supply, such as USB battery pack, USB power banks, is becoming popular. A mobile router with a plurality of USB jacks that allow the mobile router to receive power supply from one or more USB power supplies is desirable.

According to various embodiments of the present invention, one of the diodes and voltage converters to allow the mobile router to receive power supply from a plurality of power sources, including a plurality of USB power supplies, simultaneously, are used to ensure current from one power source does not go into another power sources, and to ensure desired voltage is supplied.

According to various embodiments of the present invention, voltage sensors are used to detect/measure/sense input voltages of the power supplied. As it is possible that the power supplied may start decreasing after some usage when the power sources are from one or more batteries, actions will be performed when the voltage is below a certain voltage. The actions may include generating an alarm, sending a message or shutting down part of circuitries of the mobile router.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to, portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fibre optics. Transmission media can also take the form of acoustic or light waves, such as those generated during radio-wave and infrared data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fibre optic, cable, DSL, frame relay, token ring, serial bus, USB, Firewire, PCI, or any material that can pass information. An wireless access network may be implemented using infrared, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

Reference will now be made in detail to embodiments of the present invention, examples of which are illustrated in the accompanying drawings, wherein like reference numerals refer to the like elements throughout. The embodiments are described below in order to explain aspects of the present invention by referring to the figures.

FIG. 1 illustrates a front view of mobile router 101. Mobile router 101 is capable of receiving power supply via any of USB jacks 102a, 102b, and 102c. Mobile router 101 is also capable of receiving power supply via external power supply jack 106. Local area network (LAN) interface 103a allows mobile router 101 to connect to a LAN. Wide area network (WAN) interface 103b allows mobile router 101 to connect to a WAN. Antenna ports 105a and 105b are used to connect to antennas.

Mobile router 101 has Subscriber identification module (SIM) card slot 104 for holding SIM cards. The SIM card can then be used by one or more radio frequency (RF) transceiver, such as Long-Term Evolution (LTE) manufactured by Sierra Wireless, for connecting to one or more cellular networks. Therefore, mobile router 101 is capable of allowing connected electrical devices to connect to other network elements and network nodes through the cellular networks.

Each of USB jacks 102 is capable of being connected to a USB power source. A USB power source may supply power to mobile router 101 through a USB cable and the USB is couple to one USB jack 102.

FIG. 2 illustrates a network environment according to one of the embodiments of the present invention. Mobile router 101 receives power from two USB power supplies such as USB power socket 205 via USB jack 102a and portable USB power bank 206 via USB jack 102b. LAN interface 103a is connected to LAN 204. When one of power socket 205 and portable USB power bank 206 is unplugged, mobile router 101 is still capable of operating by receiving power from the other power supplies. In one variant, when there is only one USB power supply connecting to one of USB jacks 102, mobile router 101 may enter a power-saving mode such that not all functionalities of mobile router 101 will remain in operation. This allows mobile router 101 to continue to provide some of its functionalities. In one variant, when there is only one USB power supply connecting to one of USB jacks 102, mobile router 101 may shut down or may be turned off as there may not be adequate power for mobile router 101 to operate. Mobile router 101, for illustration purpose, allows LAN 204 to communicate with host 202 through base station 203 and interconnected networks 201 with its RF transceiver and via antenna 103a.

There is no limitation that the present invention must be used for network enabled devices. For example, a USB fan that has two USB jacks for receiving power may use the present invention to receive power supply from more than one source. When the USB fan is only receiving power from one power source via one of the two USB jacks, the fan may turn slower comparing to when the USB fan is receiving power from two power sources via both of the two USB jacks. In another example, a USB video camera has three USB jacks for receiving power. The USB video camera is in operation when it receives power supply via one, two or all of its USB jacks. The power may be supplied by the same or different power sources.

FIG. 4 illustrates one of embodiments of the present invention. Mobile router 101 has a power circuit comprising voltage converters 401, 402 and diodes 410, 411a, 411b and 411c. Voltage converter 401 is used to convert the voltage of the power supplied via external power source jack 106. As the power supplied via external power source jack 106 may be unstable or may exceed the expected range for voltage converter 402 and/or loading 403, voltage converter 401 may perform the functions including: raising/lowering voltage supplied via external power source jack 106 and protecting voltage converter 402 and/or loading 403. In a preferred embodiment, voltage converter 401 converts voltage to about 5V, which is the voltage standardized for USB power supply.

Diode 410 is used to ensure currents originating from USB jacks 102a, 102b or 102c will not flow into voltage converter 401 and the power supply coupled to external power source jack 106.

Each of USB jacks 102 is capable of being coupled to a same or different USB power supply. A USB power source should supply about 5V direct current. Each of USB jacks 102 is also connected to anode of a respective diode, i.e. diodes 411a, 411b and 411c. Diodes 411a, 411b and 411c perform similar function as that of diode 410. Therefore current from a power source, such as power source coupled to external power source jack 106 or power source coupled to another USB jack, cannot flow to USB jacks.

Those who are skilled in the art would appreciate that cathodes diodes 410 are not limited to connect to USB jacks 102 directly. For example, there could be resistive, capacitive and inductive elements between a USB jack and the corresponding diode. Similarly, there could be resistive, capacitive and inductive elements between voltage converter 401 and cathode of diode 410.

Those who are skilled in the art would appreciate that cathodes of diodes 411 are not limited to voltage converter 402 directly. For example, there could be resistive, capacitive and inductive elements between cathodes of diodes 411 and voltage converter 402. Similarly, there could be resistive, capacitive and inductive elements between voltage converter 402 and cathode of diode 410.

Loading 403 is a representation of different parts of mobile router 101 that consume power. As loading 403 may require voltage that is different from 5V, voltage converter 402 is used to convert the voltage to another voltage or different voltage ranges for different sections of loading 403. For example, one section of loading 403 may require 3.3V and another section of loading 403 may require 1.8V. Then voltage converter 402 converts the voltage from 5V to 3.3V first then another voltage converter may be deployed to convert voltage from 5V to 1.8V or to converter voltage from 3.3V to 1.8V from for the respective sections. Therefore, loading 403 receives power directly or indirectly from voltage converter 402.

Those who are skilled in the art would appreciate that voltage converters are also commonly referred to as voltage regulators. Voltage converters 401 and 402 are capable of converting/shifting/regulating voltage to a desired level when the input voltage is within a voltage range. For illustrative purpose, voltage converter 401 may be able to convert/shift/regulate input voltage to substantially 5 volt as long as the input voltage is within 10 volt to 15 volt. For illustrative purpose, voltage converter 402 may be able to convert/shift/regulate input voltage to substantially 5 volt as long as the input voltage is within 4 volt to 6 volt.

In one variant, there is no external power source jack 106. Such that mobile router 101 only receives power through USB jacks 102. There is no need for voltage converter 401 and diode 410.

According to one of the embodiments of the present invention, USB jacks 102 and USB cables used for connecting USB jacks 102 to a USB power supply may have a mechanical locking mechanism. For example, the mechanical locking mechanism may be a screw lock. When a USB cable with a screw lock is inserted in, for example, USB jack 102a, and the screw lock is tightened, the probability of the USB cable being accidentally disconnected from USB jack 102a are reduced. One or more of USB jacks 102 may have the mechanical locking mechanism. As mobile router 101 may not comprise an internal battery, if a USB cable is accidentally disconnected from a USB jack 102, mobile router 101 may suddenly shut down due to low or no supply of power, especially when only one of the USB jacks 102 is connected to a USB power supply. Also, when mobile router 101 is carried around as an on-the-go/mobile device, the chances of the USB cable being disconnected are high. Therefore, it is desirable that the mechanical locking mechanism is used in order to prevent such situations. For illustration purpose, referring to FIG. 2, both USB jack 102b and portable USB power bank 206 comprise a mechanical locking mechanism, and thus can be connected using a USB cable comprising the mechanical locking mechanism. The USB cable may then be locked to both USB jack 102b and to portable USB power bank 206.

In one variant, only one of USB jacks 102, such as USB jack 102b comprises a mechanical locking mechanism, and USB jack 102a does not comprise a mechanical locking mechanism. Thus, a USB cable connecting USB jack 102b to a portable USB power bank 206 may be locked to USB jack 102b and portable USB power bank 206, and another USB cable connecting USB jack 102a to USB power socket 205 may not be locked. In this scenario, even if USB jack 102a is accidentally disconnected from USB power socket 205 due to absence of the mechanical locking mechanism, mobile router 101 may not suddenly shut down. This is because USB jack 102b may still be connected to portable USB power bank 206.

According to prior art, a USB cable with a screw lock has been disclosed in the following webpage: ¡§https://www-.coolgear.com/product/6ft-screw-lock-usb-2-hi-speed-a-to-b-device-cables¡¨. The USB cable shown in the webpage comprises a type-A plug on one side, and a type-B plug on the other side. On the other hand, in the present invention USB Jacks 102 are preferred to be USB 2.0 micro-B socket. Thus, USB cables used in the present invention for connecting USB jacks 102 to USB power supplies preferably comprises a type-A plug on one side, and a micro-B plug on the other side, which is not disclosed in the prior art.

In one variant, instead of using a screw lock, a cable holder is used to hold the USB cable that is plugged into one of USB jacks 102. A regular USB cable is first being plugged into the USB jack through the cable holder, then the cable holder is plugged to a hole or socket of mobile router 101. Therefore as long as the cable holder is securely placed, the USB cable is unlikely to be unplugged. For illustration purpose, LokU-Plug Cable Holder manufactured by Aten may be used as a cable holder for securing the USB cable. The hole or socket of mobile router 101 should be in close proximity the USB jack. For example, if there are three USB jacks, such as illustrated in FIG. 2, there should be three holes or sockets for securing USB cables to be plugged in to corresponding USB jacks 102. Each hole or socket is preferred to be within five centimeters to the corresponding USB jack 102 to allow the cable holder to be easily plugged into and to avoid tangling the USB cables.

FIG. 5 illustrates one of embodiments of the present invention. The embodiment illustrated in FIG. 5 is based on the embodiment of FIG. 4. Voltage dividers 501a, 501b, 501c and 501d are added. Voltage dividers 501 are used to provide signals to processing unit, which is part of loading 403. The signals are based on voltage levels supplied by different power sources and detected by voltage dividers 501. For example, when there is no power supplied via USB jack 102a, the voltage level detected by voltage divider 501d should be zero volt. Then processing unit will detect zero volt from voltage divider 501d through one of its input/output pins (TO Pins) and is able to recognize that no power is supplied via USB jack 102a. When there is power supplied via USB jack 102a, the voltage level at voltage divider 501d is not zero volt. However, it is possible that the voltage level supplied may be too low for loading 403. In such case, the processing unit may not be able to detect the voltage and concludes that there is no power supplied via USB jack 102a.

In another example, when there is power supplied via external power source jack 106, the voltage level at voltage divider 501a may not be zero volt. Processing unit detects voltage level from voltage divider 501b through one of its IO Pins and is able to recognize whether power is supplied via external power source jack 106. It is possible that the voltage level supplied may be too low for loading 403. In such case, the processing unit may not be able to detect the voltage and concludes that there is no power supplied via external power source jack 106.

The values of resistors chosens for creating voltage dividers 501 should be at least 10 kilohms. This ensures that only a small amount of current is driven to voltage dividers 501.

FIG. 6 illustrates one of embodiments according to the present invention. Comparing to the embodiment illustrated in FIG. 5, a voltage sensor 601 is added between voltage dividers and processing unit of loading 403. In addition, voltage dividers 501b, 501c and 501d is replaced by voltage divider 501e. Voltage divider 501e is connected to the jointed cathodes of diodes 411a, 411b, and 411c. The use of voltage sensor 601 is preferred. Voltage sensor 601 performs the function of sensing voltage level and informs processing unit whether the voltage is adequate. This may also provide protection to processing unit and loading 403, for example, in case of power surge. As there is only voltage divider 501e to determine whether there is power supplied via USB jacks 102a, 102b and 102c, voltage divider 501e is not able to distinguish where the power is from. As long as there is power supplied via one or more of USB jacks 102, there will be a voltage detected by voltage divider 501e. On the other hand, when there is no power supplied via any of USB jacks 102, there will be no voltage detected by voltage divider 501e.

Reference voltage input 602 is used to connect to a reference voltage input provided by voltage divider 603. Reference voltage input 602 is used to determine whether the voltage supplied via external power source jack 106 or USB jacks 102 are adequate. As voltage supplied after voltage converter 402 should be adequate to power loading 403, the voltage supplied after voltage converter 402 may be used as reference voltage input. Therefore, when voltage detected at voltage dividers 501a or 501e is lower than the voltage at reference voltage input 602, voltage sensor 601 may determine that the voltage is not adequate and send a logical low signal to processing unit. On the other hand, when voltage detected at voltage 501a or 501e is higher than the voltage at reference voltage input 602, voltage sensor 601 may determine that the voltage is adequate and send a logical high signal to processing unit. Out-1 and Out-2 are outputs of voltage sensor 601. Out-1 and Out-2 are used to connect to IO pins of processing unit respectively for passing the logical signals, which are corresponding to voltage levels of external power source jack 106 and USB jacks 102 determined by voltage sensor 601, to processing unit. For example, when voltage of the voltage dividers 501a detected is lower than the reference voltage at reference voltage input 602, Out-1 of a voltage sensor 601 becomes 0. Then the processing unit knows that the voltage supplied via external power source jack 106 is lower than the reference voltage and perform actions accordingly. On the other hand, when voltage of the voltage dividers 501a detected is higher than the reference voltage at reference voltage input 602, Out-1 of a voltage sensor 601 becomes 1 and the processing unit may perform corresponding actions. Similarly, when voltage of the voltage dividers 501e detected is lower than the reference voltage, Out-2 of the voltage sensor 601 becomes 0. Then processing unit knows that the voltage supplied via USB jacks 102 is lower than the reference voltage and perform actions accordingly. On the other hand, when voltage of the voltage dividers 501a detected is higher than the reference voltage at reference voltage input 602, Out-1 of a voltage sensor 601 becomes 1.

The voltage measured at reference voltage input 602 is preferred to be slightly lower than the voltage measured at the voltage dividers 501. If the voltage measured at reference voltage input 602 is always higher than the voltage measured at the voltage dividers 501, voltage sensor 602 may falsely determine that the voltage supplied by external power source jack 106 and/or USB jacks are not adequate. Similarly, if the voltage measured at reference voltage input 602 is always lower than the voltage measured at the voltage dividers 501, voltage sensor 601 may falsely determine that the voltage supplied by external power source jack 106 and/or USB jacks are adequate.

The values of resistors chosen for creating voltage divider 603 should be at least 10 kilohms to reduce current driven to voltage divider 603. Depending on the voltage output after voltage converter 402, the resistance values of resistors of voltage divider 603 should be selected accordingly. For example, when normal power is supplied via external power source jack 106 and one or more of USB jacks 102, the voltage between voltage converter 402 and loading 403 should be about 5 volt while the voltages at the output of voltage converter 401 and the jointed cathodes of diodes 411 should also be about 5 volt. In such case, the ratio of resistor values chosen for voltage divider 603 should be the same to the ratio of resistor values chosen for voltage dividers 501. For example, the values of the upper resistor and lower resistor of voltage divider 603 could be 20 kilohms and 40 kilohms (i.e., ratio of 1:2) respectively, the values of the upper resistor and lower resistor of voltage divider 501a could be 10 kilohms and 20 kilohms (i.e., ratio of 1:2) respectively and the values of the two upper resistor and lower resistor of voltage divider 501e could be 30 kilohms and 60 kilohms (i.e., ratio of 1:2) respectively.

In another example, when the loading 403 is designed to be operable at about 3.3 volt, the voltage output of voltage converter 402 should be also about 3.3 volt. When the output voltage of voltage converter 401 is 5 volt and the jointed cathodes of diodes 411 are about 5 volt, the ratio of values of the two resistors for voltage divider 603 should be different from the ratio of values of the two resistors for voltage dividers 501 such that the reference voltage at about the same voltage level of voltage dividers 501. For example, the values of the upper resistor and lower resistor of voltage divider 603 could be 20 kilohms and 20 kilohms (i.e., ratio of 1:1 and the voltage for reference voltage input 602 should be about 1.65 volt) respectively, the values of the upper resistor and lower resistor of voltage divider 501a could be 40.6 kilohms and 20 kilohms (i.e., ratio of 2.03:1) respectively and the values of the upper resistor and lower resistor of voltage divider 501e could also be 40.6 kilohms and 20 kilohms (i.e., ratio of 2.03:1) respectively. Therefore under normal operation, the voltage measured at voltage dividers 501 should also be about 1.65 volt. In order to reduce the probability that voltage sensor 601 falsely determines that the voltage supplied by external power source jack 106 and/or USB jacks are not adequate, it is preferred to have the voltage measured at reference voltage input 602 to be slightly lower than 1.65 volt. For example, values of the upper resistor and lower resistor of voltage divider 603 could be 22 kilohms and 20 kilohms respectively.

Voltage sensor 601 may be realized by using dual differential comparators, such as LM 393D manufactured by Texas Instruments. LM393D consist of two independent voltage comparators that are designed to operate from a single power supply over a wide range of voltages. There is no limitation that only LM 393D can be used to realize voltage sensor 601.

There is no limitation the number of inputs power sensor may have. For example, in one variant, voltage sensor 601 connects to respective voltage dividers 501a, 501b, 501c and 501d as illustrated in the embodiment of FIG. 5. This allows voltage sensor 601 to determine voltage level for each of voltage dividers 501. When there are more voltages to be determined, more outputs of voltage sensor 601 will be needed in order to passing the logical signals, which are corresponding to voltage levels determined by voltage sensor 601, to processing unit.

In one variant, when the operating voltage of loading 403 is at about 5 volt, and the voltage output of voltage converter 401 is at about 5 volt, voltage dividers 603, 501a and 501e could be omitted if voltage sensor only consume a small amount of current. As the voltage at ref 602 should be at about 5 volt, the input voltages from USB jacks 102 and external power source jack 106 are also at about 5 volt, there is no need to use voltage dividers to change voltage for voltage comparison performed by voltage sensor 601. The ability for voltage dividers to reduce current flow to voltage sensor 601 may be performed by internal circuit of voltage sensor 601.

FIG. 7 illustrates a process for monitoring voltage according to one of the embodiments of the present invention. The process of FIG. 7 is performed in order to ensure that a user or administrator of mobile router 101 is informed when voltage received from external power supply jack 106 and/or USB jacks 102 is not adequate for full functioning of mobile router 101. Therefore when voltage declines, it is an indication that there may soon be not enough power supply. In step 701, voltage received via external power supply pack 106, USB jacks 102a, 102b, and 102c are measured. Viewing in conjunction with FIG. 6, step 701 is performed continually by processing unit. Processing unit may receive voltage information from voltage sensor 601. Alternatively, when there is no voltage sensor 601, as shown in FIG. 5, processing unit may receive voltage information directly from voltage dividers 501. The voltage is compared to a reference voltage in step 702.

In step 702, the voltage may be compared to the reference voltage by either voltage sensor 601 or by processing unit itself. The reference voltage is determined from the reference voltage supplied to ref 602. If the voltage is not lower than reference voltage, the process ends in step 706. Alternatively, if the voltage measured is determined to be lower than the reference voltage, processing unit generates an alarm in step 703. For example, the alarm may be a sound which is generated by a speaker. The speaker is a part of loading 403. In another example, the alarm may be generated by flashing a light emitting diode (LED). The alarm is preferably continuous, such that processing unit stops generating the alarm when the voltage is determined to be approximately equal to the reference voltage and/or more power is being supplied to loading 403. If processing unit determines in step 704 that an alert message is already sent, the process ends in step 706. Alternatively, if an alert message has not been sent, processing unit sends an alert message in step 705. The alert message may be sent via an email, an instant message, a short message service (SMS) message, a phone call, a message shown in a web page, a popup message at a web page, or other indicators that can be used to send the alert message to a user or administrator of mobile router 101.

Since step 701 may be performed continuously, in order to avoid sending alert messages too frequently, the alert message is sent in step 705 only if processing unit determines in step 704 that no alert message has been sent earlier. In one variant, step 704 is omitted and an alert message is sent periodically. For example, an alert message may be sent every five minutes until processing unit determines the voltage to be approximately equal to the reference voltage and/or more power is being supplied to loading 403. In another variant, processing unit only sends up to a predefined number of alert messages periodically. For example, processing unit may send up to three alert messages. If processing unit determines that the voltage is already approximately equal to the reference voltage before three alert messages are sent, processing unit does not send any more alert messages. More precisely, if the voltage is already approximately equal to the reference voltage after sending one alert message, processing unit does not send two remaining alert messages.

FIG. 9 illustrates a block diagram of loading 403 according to one of the embodiments of the present invention.

Loading 403 comprises processing unit 901, main memory 902, system bus 903, secondary storage 904, network interfaces 905, SIM card slot 906, RF transceiver 907 and antenna 908. Processing unit 901 and main memory 902 are connected with each other directly. System bus 903 connects processing unit 901 directly with secondary storage 904, network interfaces 905 and RF transceiver 907. Also, voltage sensor 601 is directly connected to processing unit 901. Processing unit 901 performs the functions of processing unit discussed in the embodiments of the present invention.

In one variant, voltage sensor does not connect to processing unit directly, but instead through another circuit, such as system bus 903. In one variant, for embodiment illustrated in FIG. 8, voltage sensor 601 illustrated in FIG. 9 is replaced by voltage sensors 801a, 801b, 801c and 801d such that processing unit 901 may receive voltage information from more than one voltage sensors.

Processing unit 901 executes program instructions or code segments for implementing embodiments of the mobile router of the present invention. A Processing unit may be a microprocessor, a microcontroller, a digital signal processor (DSP), any combination of those devices, or any other circuitry configured to process information.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, hard disk, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges and various other mediums capable of storing, containing or carrying instruction(s) and/or data.

Main memory 902 and secondary storage 904 are storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The storage medium may include a number of software modules that may be implemented as software code to be executed by the processing unit 901 using any suitable computer instruction type. The software code may be stored as a series of instructions or commands, or as a program in the storage medium.

Using system bus 903 allows loading 403 to have increased modularity. System bus 903 can be any of several types of bus structures including a memory bus, a peripheral bus, and a local bus using any of a variety of bus architectures.

Network interfaces 905 can be Ethernet interfaces, frame relay interfaces, fibre optic interfaces, cable interfaces, DSL interfaces, token ring interfaces, serial bus interfaces, universal serial bus (USB) interfaces, Firewire interfaces, Peripheral Component Interconnect (PCI) interfaces, etc.

Network interfaces 905 may be configured to transmit and/or receive data using a variety of different communication protocol.

Network interfaces 905 may be implemented by an stand-alone electronic component or may be integrated with other electronic components. A network interface may have no network connection or at least one network connection depending on the configuration. A network interface is only connected to one accessible network. Therefore, there may be more than one network connection being carried by one accessible network.

RF transceiver 907 may be directly connected to system bus 903, SIM card slot 906 and antenna 908. RF transceiver 907 is capable of transmitting and receiving data received via system bus 903 to and from a base station through antenna 908. As RF transceiver 907 is connected to SIM card slot 906, RF transceiver 907 is able to write and retrieve SIM card information to and from a SIM card inserted to SIM card slot 906. Furthermore, antenna 908 is connected to RF transceiver 907. Antenna 908 is used to transmit and receive electrical signal to and from a base station.

FIG. 10 illustrates one of embodiments of the present invention. FIG. 10 is similar to FIG. 4 but voltage converter 402, diodes 411 and USB jack 102c are removed in FIG. 10. USB jack 102c is removed for easy reading. Also, diodes 1001, diode 1002 and terminal block 1003 are inserted in FIG. 10. Voltage converter 401 illustrated in FIG. 4 is replaced by voltage converter 1004. Voltage converter 1004 is used to convert the voltage of power supplied via terminal block 1003 and external power source jack 106. As voltage range of power supplied via terminal block 1003 and external power source jack may be large, voltage converters that allow large input voltage range should be used for voltage converter 1004. Furthermore, voltage converter 1001 is used to convert the voltage of power supplied via USB jacks 102a and 102b. Diodes 1001 may be realized by using LTC 4415 dual ideal diodes manufactured by Linear Technology. LTC 4415 has two diodes built-in and can be use to directly connect to two power sources, such USB jacks 102a and 102b. The function of diode 1002 is to ensure that currents originating from terminal block 1003 and external power source jack 106 will not flow into diodes 1001. In one variant, diode 1002 may be omitted if diodes 1001 is capable of not receiving power from cathode of diode 410.

In one variant, when voltage output of voltage converter 1004 and/or voltage output of voltage converter is higher than operating, one or more voltage converters may be added before connecting to loading 403.

FIG. 11 illustrates a process for monitoring voltage according to one of the embodiments of the present invention. The process of FIG. 11 is similar to that of in FIG. 7 but the process of FIG. 11 compares the voltage received from external power supplies with two reference voltages. In step 1101, voltage received via external power source jack 106, USB jacks 102 are measured. Viewing in conjunction with FIG. 8, step 1101 is performed continually by processing unit 901. Processing unit 901 may receive voltage information from voltage sensors 801. Alternatively, when there is no voltage sensors 801, processing unit 901 may receive voltage information directly from voltage dividers 501. The voltage is compared to the second reference voltage in step 1102. If the voltage is below the second reference voltage, processing unit 901 will perform a second action in step 1105. For example, processing unit 901 may generate a second alarm. Otherwise, processing unit 901 compares the voltage with the first reference voltage in step 1103. If the voltage is below the first reference voltage in step 1103, processing unit 901 will perform a first action in step 1104. The first action may be to generate a first alarm by processing unit 901. Otherwise, the process ends in step 1106. For illustration purpose only, the first reference voltage is set to 4.8 volt and the second reference voltage is set to 4.5 volt. If the voltage measured in step 1101 is 4.7 volt, processing unit 901 will generate a first alarm in step 1104. If the voltage measured in step 1101 is 4.4 volt, processing unit 901 will generate a second alarm in step 1105. Furthermore, if the voltage measured in step 1101 is 5 volt, no alarm will be generated and the process will be ended in step 1106. The second alarm may be considered as more serious than the first alarm. For example, both the first and second alarms are sound alarms and the second alarm is much louder than the first alarm. Therefore a user may be able to notice that a more serious problem is occurring. There is no limitation of what an action must be. For example, the action may also be to send an alert message or display a visual indicator (like flashing LED light). The first reference voltage is preferred to be set higher than the second reference voltage as dropping below the second reference voltage may be power supplied will soon be not adequate than dropping below the first reference voltage.

In one embodiment, instead of generating an alarm in steps 1104 and 1105, processing unit 901 may shut down part of mobile router 101 or loading 403 in order to reduce power consumption. For example, if the voltage measured in step 1101 is 4.8 volt, processing unit 901 may turn off a LCD display coupled to mobile router 101. In another example, processing unit 901 may lower clock frequency to reduce power consumption. If the voltage measured in step 1101 further reduced to 4.4 volt, processing unit 901 may save data into secondary storage 904 and then put mobile router 101 in hibernate mode.

Those who are skilled in the art would appreciate that there are many methods to measure a voltage. By using a voltage comparator sa to measure voltage is only one of my many methods.

A plurality of voltage sensors 801 are used to detect voltage supplied via 106, 102a, 102b and 102c respectively. For each of voltage sensors 801a-d, there are two reference voltages. The first reference voltage is provided by voltage divider 820. The second reference voltage is provided by voltage divider 821. The second reference voltage is lower than the first reference voltage. The second reference voltage should still be within an operating voltage of loading 403. Each of voltage sensors 801a-d is connected to corresponding voltage dividers 501a-501d. Therefore each of voltage sensors 801a-d is capable of detecting voltage level supplied by external power source jack 106 and USB jacks 102a-c respectively.

When voltage of the power supplied is lower than the first reference voltage, Out-1 of a voltage sensor 801 will be changed to 0 from 1 or remain at 0. Then processing unit knows that the voltage supplied is lower than the first reference voltage and perform actions accordingly, such as send an alert message as described in step 705 and/or generating an alarm as described in step 703. When voltage of the power supplied is lower than the second reference voltage, Out-2 of the voltage sensor 801 will also be changed to 0 from 1 or remain at 0. Then processing unit knows that the voltage supplied is also lower than the second reference voltage and perform actions accordingly, such as send a more critical alert message and/or generating a more serious alarm.

The use of two references voltages allows processing unit to identify whether the voltage supplied via a power source is deteriorating and prompts the user/administrator accordingly. The use of one voltage sensor for one power source allows processing unit to identify which power source is deteriorating in supply adequate voltage. For Those who are skilled in the art would appreciate that it is common voltage supplied from a portable power source may be deteriorating when the battery of the portable power source is about to be used up.

In a more detailed example, voltage sensor 801b has two sets of voltage comparators. Therefore voltage sensor 801b is capable of comparing a first input voltage against a first reference voltage supplied to ref 802b and comparing a second input voltage against a second reference voltage supplied to ref 803b. The voltage detected by voltage divider 501b is used for both first input voltage and second input voltage. Therefore the first input voltage and the second input voltage may be the same. The voltage detected at voltage divider 820 is used as the first reference voltage supplied to ref 802b. The voltage detected at voltage divider 821 is used as the second reference voltage supplied to ref 803b. When operating with adequate voltage, both first and second reference voltages should be slightly below than the first input voltage and the second input voltage in order to reduce the probability that voltage sensor 801a falsely determines that the voltage supplied via USB jack 102a is not adequate.

As voltage converter 402 is providing voltage at substantially 5 volt, first and second reference voltages should be maintained substantially at the respective reference voltages. For example, the first reference voltage may be selected to be 2.4 volt while the second reference voltage may be selected to 2.2 volt. These two reference voltages are selected because they are slight less than half of 5 volt. The method to determine resistance values of the resistors composing voltage dividers 820 and 821 are similar to the method to determine resistance value of the resistors composing voltage divider 603. For example, the values of the upper resistor and lower resistor of voltage divider 820 may be 26 kilohm and 24 kilohm respectively; the values of the upper resistor and lower resistor of voltage divider 821 may be 28 kilohm and 22 kilohm respectively. Those who are skilled in the art would also appreciate different values of resistance values of the resistors may be used.

When the first and second input voltages provided by voltage divider 501b are lowered than the first reference voltage, Out-1 of voltage sensor 801b is changed from 1 to 0 to indicate that the first and second input voltages are lower than 2.4 volt. This allows processing unit at loading 403 to perform according operations. When the first and second input voltages are lower than the second reference voltage, Out-2 of voltage sensor 801b is also changed from 1 to 0 to indicate that the first and second input voltages are lower than 2.2 volt. Processing unit at loading 403 then performs according operations.

Those who are skilled in the art who appreciate that there is no limitation that four voltage sensors must be deployed for four power sources. The number of voltages sensors required depending on the number of comparators a voltage sensor has and the number of reference voltages to be used. For example, if a voltage sensor has eight comparators, voltage sensors 801a-d can be replaced by the voltage sensor.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 illustrates a front view of a mobile router.

FIG. 2 illustrates a network environment according to various embodiments of the present invention.

FIG. 3 illustrates a prior art Dual-input USB cable.

FIG. 4 is an illustrative block diagram of a mobile router.

FIG. 5 is an illustrative block diagram of a mobile router with voltage dividers according to one of the embodiments of the present invention.

FIG. 6 is an illustrative block diagram of a mobile router with voltage dividers and one voltage sensor according to one of the embodiments of the present invention.

FIG. 7 is a flowchart illustrating a process according to one of the embodiments of the present invention.

FIG. 8 is an illustrative block diagram of a mobile router with voltage dividers and voltage sensors according to one of the embodiments of the present invention.

FIG. 9 is an illustrative block diagram of a loading according to one of the embodiments of the present invention.

FIG. 10 is an illustrative block diagram of a mobile router.

FIG. 11 is a flowchart illustrating a process according to one of the embodiments of the present invention.

The invention claimed is:

1. An electronic apparatus capable of using a plurality of external universal serial bus (USB) power sources, the electronic apparatus comprising:
   a plurality of USB jacks, mounted on one of the surface of the electronic apparatus, wherein each of the plurality of USB jacks is capable of allowing a USB cable to couple to;
   a plurality of first diodes, wherein the anode of each first diode is connected to one of the plurality of USB jacks, wherein the cathodes of the first diodes are jointed together;
   at least one external power source jack, mounted on one of the surface of the electronic apparatus, wherein the external power source jack is capable of allowing an electrical cable coupled to;
   a second diode;
   a first voltage converter, wherein input of the first voltage converter connects to the external power source jack and the output of the first voltage converter is connected to the anode of the second diode;
   at least one processing unit;
   at least one main memory;
   at least one network interface;
   at least one subscriber identification module (SIM) card slot;
   at least one radio frequency (RF) transceiver;
   at least one secondary storage; and
   wherein the cathode of the second diode is joined together with the cathodes of the first diodes.

2. The electronic apparatus of claim 1, further comprising a first voltage sensor, wherein one of the input voltages of the first voltage sensor is connected to the jointed cathodes of the first diodes; and wherein at least one of the outputs of the first voltage sensor provides voltage level information to the at least one processing unit.

3. The electronic apparatus of claim 1, further comprising a second voltage sensor, wherein one of the input voltages of the second voltage sensor is connected to the anode of the second diode; and wherein at least one of the outputs of the second voltage sensor provides voltage level information to the at least one processing unit.

4. The electronic apparatus of claim 1, further comprising a plurality of third voltage sensors, wherein inputs of the third voltage sensors are connected to the anodes of respective first diodes; and wherein at least one of the outputs of the third voltage sensor provides voltage level information to the at least one processing unit.

5. The electronic apparatus of claim 1, further comprising a second voltage converter, wherein the input of the second voltage converter is connected to the jointed cathodes of the first diodes and the second diode; and wherein the output of the second voltage converter provides power directly or indirectly to the at least one processing unit, the at least one main memory, the at least one network interface, the at least one RF transceiver, and the at least one secondary storage.

6. The electronic apparatus of claim 1, further comprising a mechanical lock at each of the plurality of USB jacks.

7. The electronic apparatus of claim 1, further comprising a hole or socket, wherein the hole or socket is used for a cable holder to plug into.

8. The electronic apparatus of claim 1, wherein the at least one secondary storage stores program instructions executable by the at least one processing unit for the steps of:
measuring one or more of the voltages supplied through the plurality of USB jacks; and
performing a first action when the one or more of the voltages supplied is below a first reference voltage.

9. The electronic apparatus of claim 8, wherein the first action is chosen from a group consisting of generating a first alarm, sending a first message and shutting down a first part of circuitries of the electronic apparatus.

10. The electronic apparatus of claim 8, wherein the at least one secondary storage further stores program instructions executable by the at least one processing unit for performing a second action when the one or more of the voltages supplied is below a second reference voltage, and wherein the second action is chosen from a group consisting of generating a first alarm, sending a first message and shutting down a first part of circuitries of the electronic apparatus.

11. A method of performing an action at a mobile router, wherein the mobile router is capable of receiving power from a plurality of USB jacks, comprising the steps of:
measuring one or more of the voltages supplied through the plurality of USB jacks; and
determining whether the one or more of the voltages supplied is below a first reference voltage; wherein the first reference voltage is determined from a reference voltage supplied to a reference voltage input provided by a voltage divider; wherein the one or more of the voltages supplied is determined by a voltage sensor;
wherein one of the input voltages of the voltage sensor is connected to jointed cathodes of a plurality of first diodes; wherein at least one of the outputs of the voltage sensor provides voltage level information to at least one processing unit of the mobile router;
if the one or more voltages supplied is below the first reference voltage: (i) determining whether a first action has been performed within a predefined time period; (ii) performing the first action if the first action has not been performed within the predefined time period; wherein the first action is to generate a first alarm.

12. The method of claim 11, wherein the first action is performed until it is determined that the one or more of the voltages supplied are approximately equal to the first reference voltage to generate the first alarm.

13. The method of claim 11, wherein the first action is to further send a first message.

14. The method of claim 11, wherein the first action is to further shut down a first part of circuitries of the mobile router.

15. The method of claim 11, further comprising: performing a second action when the one or more of the voltages supplied is below a second reference voltage.

16. The method of claim 15, wherein the second action is to generate a second alarm.

17. The method of claim 15, wherein the second action is to send a second message.

18. The method of claim 15, wherein the second action is to shut down a second part of circuitries of the mobile router.

* * * * *